(12) United States Patent
Yang et al.

(10) Patent No.: US 11,852,787 B2
(45) Date of Patent: Dec. 26, 2023

(54) HEAD-MOUNTED DEVICE

(71) Applicant: LARGAN PRECISION CO., LTD., Taichung (TW)

(72) Inventors: Fuh-Shyang Yang, Taichung (TW); Kuan-Ming Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/723,558

(22) Filed: Apr. 19, 2022

(65) Prior Publication Data
US 2023/0048991 A1    Feb. 16, 2023

(30) Foreign Application Priority Data
Aug. 16, 2021 (TW) ................. 110209649

(51) Int. Cl.
| | | |
|---|---|---|
| *G02B 13/00* | (2006.01) | |
| *G02B 27/00* | (2006.01) | |
| *G02B 27/30* | (2006.01) | |
| *G06F 1/16* | (2006.01) | |
| *H04N 9/31* | (2006.01) | |
| *H04N 13/344* | (2018.01) | |
| *H04N 13/383* | (2018.01) | |
| *H04N 23/55* | (2023.01) | |
| *H04N 23/90* | (2023.01) | |

(52) U.S. Cl.
CPC ....... *G02B 13/003* (2013.01); *G02B 27/0093* (2013.01); *G02B 27/30* (2013.01); *G06F 1/163* (2013.01); *H04N 9/3147* (2013.01); *H04N 13/344* (2018.05); *H04N 13/383* (2018.05); *H04N 23/55* (2023.01); *H04N 23/90* (2023.01)

(58) Field of Classification Search
CPC .. G02B 13/003; G02B 27/0093; G02B 27/30; G06F 1/163; H04N 9/3147; H04N 13/344; H04N 13/383; H04N 23/55; H04N 23/90
See application file for complete search history.

(56) References Cited

U.S. PATENT DOCUMENTS

| | | |
|---|---|---|
| 8,022,977 B2 | 9/2011 | Kanade et al. |
| 8,842,367 B2 | 9/2014 | Chen |
| 9,225,888 B2 | 12/2015 | Huang |
| 9,389,423 B2 | 7/2016 | Bhardwaj et al. |
| 9,749,547 B2 | 8/2017 | Venkataraman et al. |
| 9,851,564 B2 | 12/2017 | Riccomini et al. |
| 9,860,522 B2 | 1/2018 | Lapstun |
| 10,203,489 B2 | 2/2019 | Khan et al. |
| 10,310,598 B2 | 6/2019 | Trail et al. |
| 10,330,935 B2 | 6/2019 | Shpunt |

(Continued)

*Primary Examiner* — Nasim N Nirjhar
(74) *Attorney, Agent, or Firm* — McClure, Qualey & Rodack, LLP

(57) ABSTRACT

A head-mounted device includes a first light field camera, a second light field camera, a first light field display, a second light field display and a supporting structure. Each of the first light field camera and the second light field camera includes, in order from an object side to an image side, a lens group, a collimator and an image sensor. Each of the lens groups includes a plurality of lens units. The lens units are arranged in a two-dimensional lens array, and each of the lens units includes a lens container and a plurality of lens elements. A first engaging structure is disposed between at least two adjacent lens elements of the lens elements.

18 Claims, 15 Drawing Sheets

(56) References Cited

U.S. PATENT DOCUMENTS

| | | | |
|---|---|---|---|
| 10,429,656 B1 | 10/2019 | Sharma et al. | |
| 10,506,217 B2 | 12/2019 | Linde et al. | |
| 10,714,520 B1 * | 7/2020 | Liu | G06F 3/011 |
| 10,788,677 B2 | 9/2020 | Geng et al. | |
| 10,816,804 B2 | 10/2020 | Martinez et al. | |
| 10,816,810 B1 | 10/2020 | Choi et al. | |
| 11,448,798 B1 * | 9/2022 | Ouderkirk | G02B 5/08 |
| 2018/0081092 A1 | 3/2018 | Hudman | |
| 2019/0166359 A1 * | 5/2019 | Lapstun | H04N 13/307 |
| 2019/0384062 A1 | 12/2019 | Wilson et al. | |
| 2020/0033586 A1 | 1/2020 | Suzuki et al. | |
| 2020/0049956 A1 | 2/2020 | Chan | |
| 2020/0166734 A1 | 5/2020 | Chung | |
| 2020/0225489 A1 | 7/2020 | Huo et al. | |
| 2020/0272022 A1 | 8/2020 | Myhre et al. | |
| 2020/0401361 A1 | 12/2020 | Han et al. | |
| 2020/0410921 A1 | 12/2020 | Kim et al. | |
| 2021/0014473 A1 * | 1/2021 | Hua | G02B 30/27 |
| 2021/0019912 A1 * | 1/2021 | Cutler | H04N 13/232 |
| 2022/0279137 A1 * | 9/2022 | Lasiter | H01L 27/14618 |

* cited by examiner

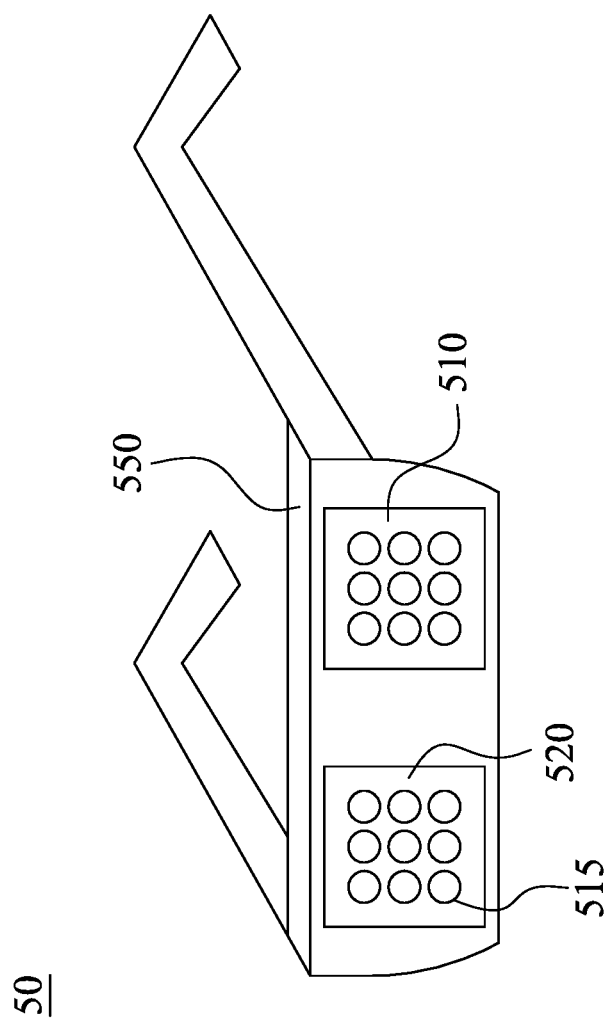
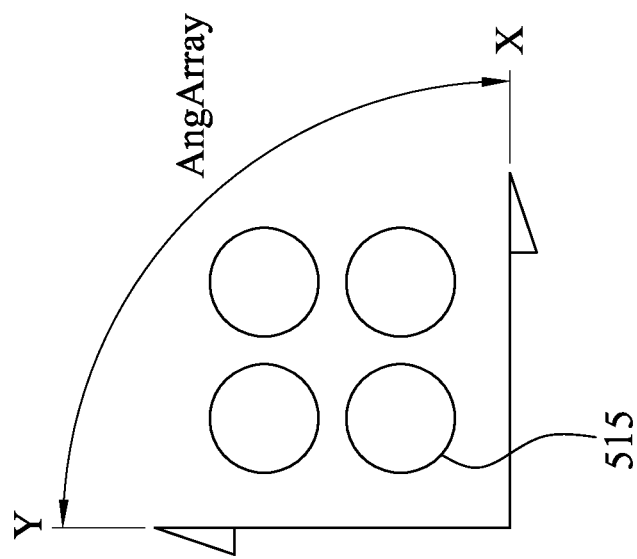
Fig. 5A
Fig. 5B

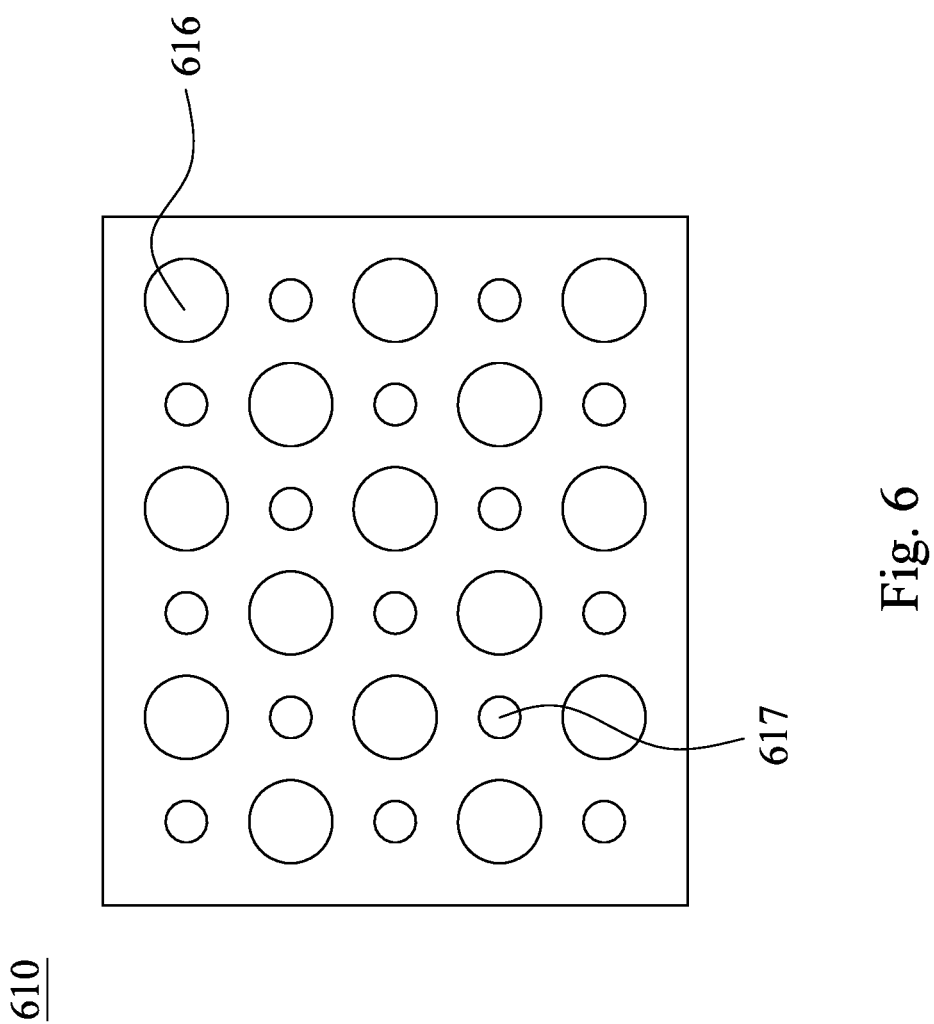

HEAD-MOUNTED DEVICE

RELATED APPLICATIONS

This application claims priority to Taiwan Application Serial Number 110209649, filed Aug. 16, 2021, which is herein incorporated by reference.

BACKGROUND

Technical Field

The present disclosure relates to a head-mounted device. More particularly, the present disclosure relates to a head-mounted device applied to the field of AR, VR or MR.

Description of Related Art

With recent technology advances of semiconductor manufacturing, performance of microelectronic elements is enhanced, and the smaller pixel size of image sensors can be achieved. Therefore, micro optical lens assemblies with high image quality have become an indispensable part of many modern electronics. In the meanwhile, while microprocessors with high performance and micro displays have become popular, the technology related to smart head-mounted devices has improved in the recent years. With Artificial Intelligence advancements, electronic devices with optical lens assemblies can be widely adopted, and requirements for optical lens assemblies have become more diverse due to higher demands in computer visions. Recent head-mounted devices are not only lighter than before, but also equipped with various smart functions in increasingly popular fields, such as VR, AR and MR.

In many smart head-mounted devices, the imaging camera modules are used for positioning and motion tracking, and the eye-tracking cameras are used for tracking the gaze direction of the user's eyes. Therefore, processing load of real time images can be reduced, and images with high clarity and low latency can be provided so as to achieve the immersive visual experience for users. At least one camera module is configured in conventional head-mounted devices of AR, VR or MR for providing functions of image capturing. The camera modules are used for spatial positioning and mapping of the head-mounted devices such as simultaneous localization and mapping (SLAM). Also, pass-through cameras can be configured in head-mounted devices. Via displays of head-mounted devices, the pass-through cameras can capture the image in the real world and present the image on the displays in real time so as to provide the outside image information. Hence, AR and MR functions can be provided while replacing the need for the translucent optics on the conventional AR head-mounted device.

Furthermore, Vergence-Accommodation Conflict (VAC) occurs in the conventional head-mounted device with the non-translucent display, which may cause uncomfortable user experiences. Therefore, there is a need to develop a head-mounted device which can provide the high image quality in real time and reduce the VAC problem.

SUMMARY

According to one aspect of the present disclosure, a head-mounted device includes a first light field camera, a second light field camera, a first light field display, a second light field display and a supporting structure. The first light field camera and the second light field camera face towards the same direction. The first light field display and the second light field display face towards the same direction. The first light field camera, the second light field camera, the first light field display and the second light field display are all connected to the supporting structure. Each of the first light field camera and the second light field camera includes, in order from an object side to an image side, a lens group, a collimator and an image sensor. Each of the lens groups includes a plurality of lens units. The lens units are arranged in a two-dimensional lens array, and each of the lens units includes a lens container and a plurality of lens elements. A first engaging structure is disposed between two adjacent lens elements of the plurality of the lens elements.

According to another aspect of the present disclosure, a head-mounted device includes a first light field camera, a second light field camera, a first light field display, a second light field display and a supporting structure. The first light field camera and the second light field camera face towards the same direction. The first light field display and the second light field display face towards the same direction. The first light field camera, the second light field camera, the first light field display and the second light field display are all connected to the supporting structure. Each of the first light field camera and the second light field camera includes, in order from an object side to an image side, a lens group, a collimator and an image sensor. Each of the lens groups includes a lens group cover and a plurality of lens assemblies. The lens group cover includes a plurality of openings, and the openings are arranged in a two-dimensional aperture array. The lens assemblies are arranged in a two-dimensional lens array corresponding to the two-dimensional aperture array, each of the lens assemblies includes a plurality of lens elements, and a first engaging structure is disposed between two adjacent lens elements of each of the lens assemblies.

BRIEF DESCRIPTION OF THE DRAWINGS

The present disclosure can be more fully understood by reading the following detailed description of the embodiment, with reference made to the accompanying drawings as follows:

FIG. 10 shows an exploded view of the first light field camera according to the 1st embodiment in FIG. 1A.

FIG. 5A shows a schematic view of a head-mounted device according to the 5th embodiment of the present disclosure.

FIG. 5B shows a partial schematic view of the two-dimensional lens array of the lens units of the second light field camera according to the 5th embodiment in FIG. 5A.

FIG. 6 shows a schematic view of a first light field camera of a head-mounted device according to the 6th embodiment of the present disclosure.

DETAILED DESCRIPTION

Figure 1A:
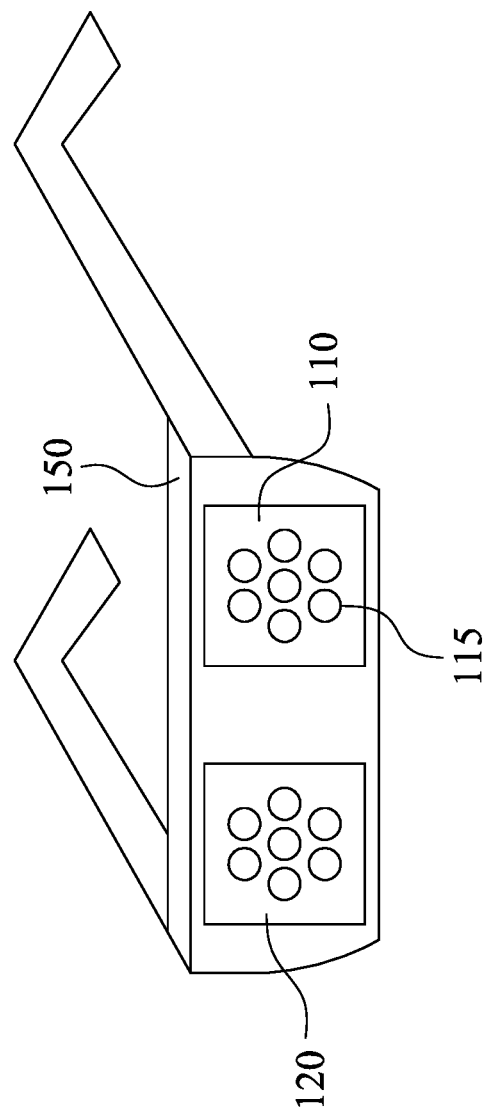
FIG. 1A shows a schematic view of a head-mounted device according to the 1st embodiment of the present disclosure.

The present disclosure provides a head-mounted device which includes a first light field camera, a second light field camera, a first light field display, a second light field display and a supporting structure. The second light field camera and the first light field camera face towards the same direction. The second light field display and the first light field display face towards the same direction. The first light field camera, the second light field camera, the first light field display and the second light field display are all connected to the supporting structure. Each of the first light field camera and the second light field camera includes, in order from an object side to an image side, a lens group, a collimator and an image sensor. Each of the lens groups includes a plurality of lens units or a plurality of lens assemblies. Each of the lens units and each of the lens assemblies include a plurality of lens elements and are arranged in a two-dimensional lens array, respectively. A first engaging structure is disposed between two adjacent lens elements of each of lens element units or each of the lens assemblies. Via the configuration of the lens groups, a microlens array can be formed by the lens groups of the light field camera and can be configured with the collimator and the image sensor having high resolution. Hence, the light head-mounted device with high image quality can be provided and the Vergence-Accommodation Conflict can be reduced.

Furthermore, via the engaging structure between the two adjacent lens elements, the collimation of the optical axis can be improved compared with conventional microlens arrays or the wafer lenses. Hence, higher image quality can be provided.

Specifically, when each of the lens groups includes the lens units, the lens assemblies are arranged in the two-dimensional lens array, and each of the lens units includes a lens container and the lens elements. Hence, via the configuration of the individual lens container in each of the lens units, better axial collimation of the optical axis in each of the lens units and the image quality can be provided. Moreover, each of the lens units can be fixed by utilizing the engaging structure and the structure of the corresponding lens container at the same time so as to improve the stability of production yields.

Specifically, when each of the lens groups includes the lens assemblies, each of the lens groups can further include a lens group cover. The lens group container includes a plurality of openings, and the openings are arranged in a two-dimensional aperture array. The lens assemblies are arranged in the two-dimensional lens array corresponding to the two-dimensional aperture array. Hence, via one container shared by the lens assemblies, the spacing distance between the lens assemblies can be distributed correctly. Thus, the range of imaging overlaps from each of the lens assemblies can be reduced and the spacing distance between the lens assemblies can be shortened easily so as to miniaturize the entire lens groups.

Each of the lens units can include an imaging region, and each of the image sensors of the first light and second light field cameras can include a sensing region. In each of the first light field camera and the second light field camera, a total area of the imaging regions thereof is smaller than an area of the sensing region thereof. Specifically, the sensing region of each of the image sensors is a combined imaging region covering the imaging regions of the lens units so as to capture the images from each of the lens units in real time. Similarly, each of the lens assemblies can include an imaging region as the aforementioned imaging region of each the lens units, and will not be described here again. Hence, the time lag caused by synchronizing the image signals in the configuration of a plurality of image sensors can be prevented so as to provide real-time images to the user effectively.

A total image resolution of the first light field camera can be the same as a resolution of the first light field display, and a total image resolution of the second light field camera can be the same as a resolution of the second light field display. Therefore, the images in different fields of view can be assembled at the same resolution by arranging the resolution of the light field camera corresponding to the resolution of the light field display, so that the images can be presented in real time on the light field display with the same resolution. Hence, the image processing such as compression and decompression of image data can be reduced.

Each of the first light field display and the second light field display can include at least two million pixels. Hence, it is favorable for providing higher quality of real images in 2K resolution by increasing the resolution of the light field displays so as to improve user experiences. Furthermore, each of the first light field display and the second light field display can include at least eight million to thirty million pixels. Hence, 4K or 8K resolution can be provided. Moreover, each of the first light field display and the second light field display can include two million to thirty million, four million to twenty million or four million to ten million pixels etc. Hence, it is favorable for balancing between image quality and power consumption according to device specifications.

The first engaging structure of each of the lens groups can include a first engaging surface. The first engaging surface is a contact surface between the two adjacent lens elements. When an acute angle between the first engaging surface and the optical axis of the two adjacent lens elements is AngEng1, the following condition can be satisfied: 5 degrees<AngEng1<85 degrees. Hence, the good manufacturability of the lens elements can be provided and the engaging compatibility between the adjacent elements can be improved. Moreover, at least one of the following conditions can be satisfied: 5 degrees<AngEng1<50 degrees; 10 degrees<AngEng1<30 degrees; and 15 degrees<AngEng1<25 degrees.

Furthermore, there can be a second engaging structure between another two adjacent lens elements and the second engaging structure includes a second engaging surface. The second engaging surface is a contact surface between the aforementioned other two adjacent lens elements. When an acute angle between the second engaging surface and the optical axis of the aforementioned other two adjacent lens elements is AngEng2, the following condition can be satisfied: 5 degrees<AngEng2<85 degrees. Specifically, each of the lens units or the lens assemblies can include multiple engaging structures. Hence, it is favorable for enhancing the assembling quality of the lens elements so as to improve the image quality of the light field camera.

Moreover, the first engaging surface and the second engaging surface can be configured on two surfaces of the same lens element, respectively. Hence, the lens element with double engaging surfaces can be the basis for providing good assembling quality of the axial alignment for the entire lens assembly so as to further improve the image quality.

When an angle between a row direction and a column direction in the two-dimensional lens array is AngArray, the following condition can be satisfied: 30 degrees<AngArray≤90 degrees. Hence, it is favorable for balancing between the compactness of the lens groups and the manufacturing yield rate. Moreover, the following condition can be satisfied: 60 degrees<AngArray≤90 degrees.

Each of the lens groups can further include a first lens subgroup and a second lens subgroup. A maximum field of view of each lens unit of the first lens subgroup is larger than a maximum field of view of each lens unit of the second lens subgroup. Each of the lens units of the first lens subgroup and the second lens subgroup can have different focal lengths and field of view by arranging the first lens subgroup and the second lens subgroup so as to provide the images with different depths of field. Hence, the required total number of the lens units of the lens groups can be reduced.

Each of the lens groups can further include a third lens subgroup. A maximum field of view of each lens unit of the third lens subgroup is larger than the maximum field of view of each lens unit of the first lens subgroup and the maximum field of view of each lens unit of the second lens subgroup. Hence, images with more depths of view can be further provided.

One of the two adjacent lens elements of each of the lens assemblies can be an array element, a lens array structure can be formed by the array elements, and the each array element of the lens array structure corresponds to each of the lens assemblies of the two-dimensional lens array formed by the lens assemblies. Hence, the spacing distances between the lens assemblies can be regulated on the basis of the lens array structure. Moreover, it is favorable for controlling the difference in fields of view between the imaging regions corresponding to the adjacent lens assemblies.

When a total number of the lens assemblies of each of the lens groups is Nlens, the following condition can be satisfied: 6<Nlens. Hence, the sufficient resolution of light fields can be provided. Moreover, at least one of the following conditions can be satisfied: 6<Nlens<60; and 7≤Nlens<55. Hence, it is favorable for obtaining the balance between compactness of the head-mounted device and the resolution of the light field display thereof by controlling the total number of the lens units in each of the lens groups.

Each of the first light field display and the second light field display can be a multi-layer tensor display. Specifically, each of the first light field display and the second light field display can be a multi-view projector array, integrated imaging display or multi-layer tensor display, but the present disclosure is not limited thereto. Hence, the light field display with compactness and high resolution can be provided.

The head-mounted device can further include a first eye tracking camera and a second eye tracking camera. The first eye tracking camera is disposed on the same side of the first light field display and the second eye tracking camera is disposed on the same side of the second light field display, and both the first eye tracking camera and the second eye tracking camera are connected to the supporting structure, respectively. The foveated rendering can be used in the head-mounted device so as to decrease the required rendering load of the light field display by arranging the first eye tracking camera and the second eye tracking camera.

Moreover, the aforementioned collimator can have a porous structure, a light grating, a plurality of dielectric layers or a multicolor light filter. Hence, the crosstalk of the image signals can be prevented.

According to the above description of the present disclosure, the following specific embodiments are provided for further explanation.

1ST EMBODIMENT

Figure 1B:
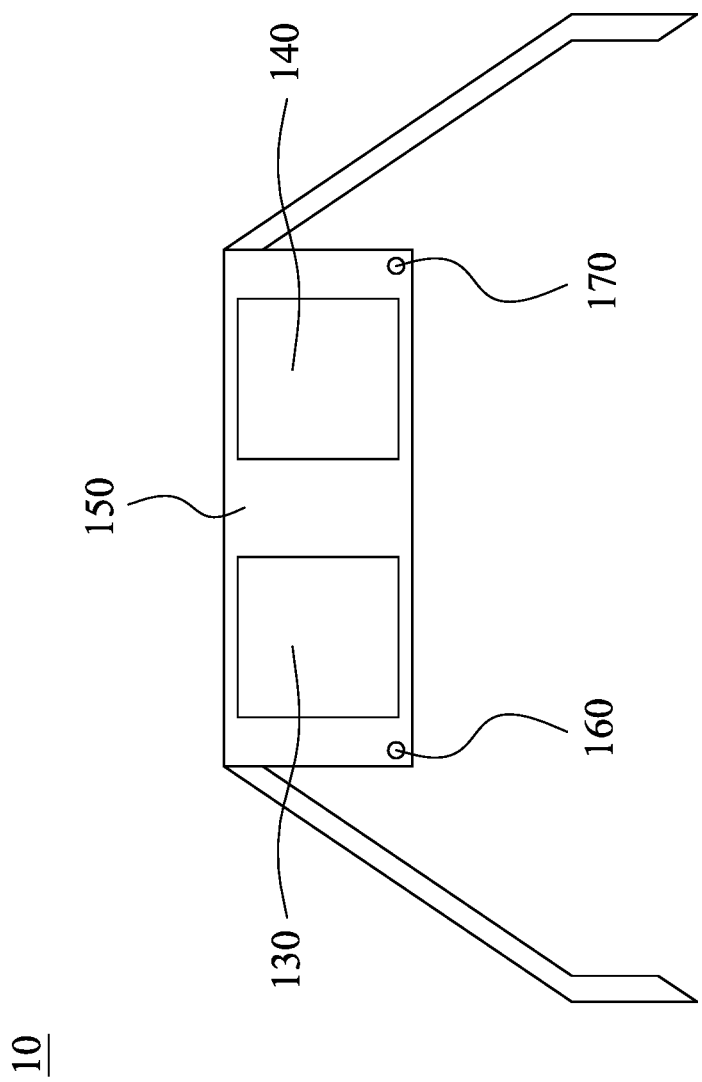
FIG. 1B shows another schematic view of the head-mounted device according to the 1st embodiment in FIG. 1A.
Figure 1C:
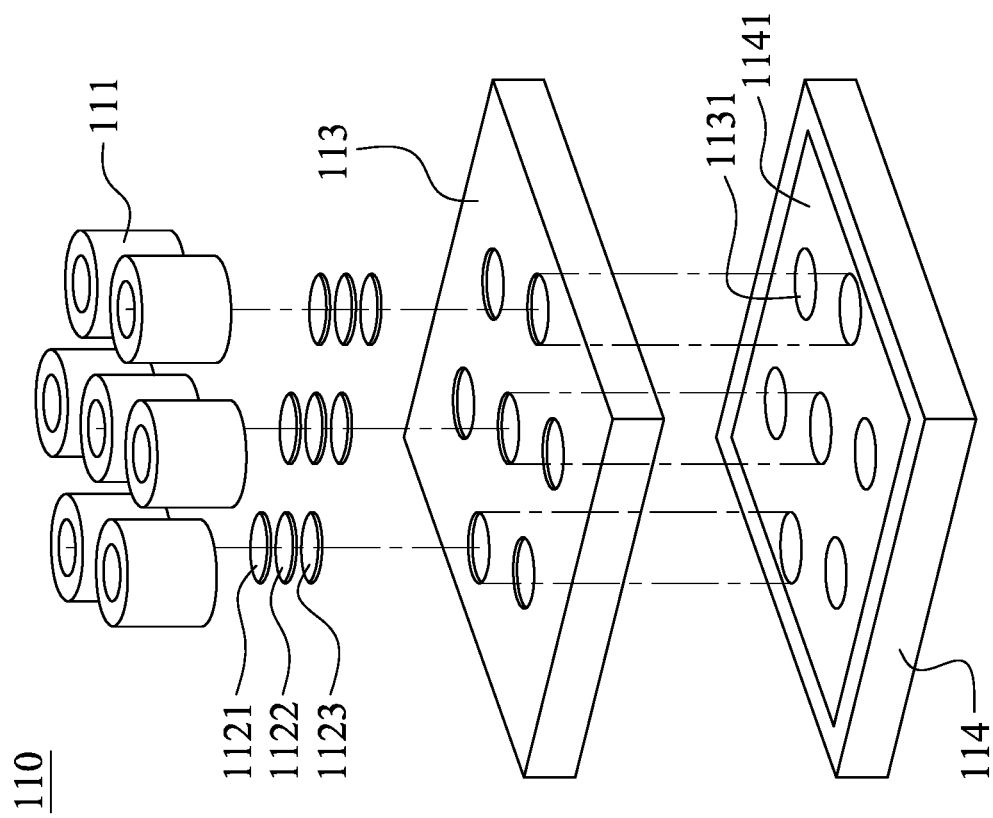
FIG. 1D shows a cross-sectional view of each of the lens units according to the 1st embodiment in FIG. 10.
FIG. 1E shows a partial enlarged view of the first engaging structure according to the 1st embodiment in FIG. 1D.
FIG. 1F shows another partial enlarged view of the second engaging structure according to the 1st embodiment in FIG. 1D.
FIG. 1G shows a block schematic view of the head-mounted device according to the 1st embodiment in FIG. 1A.

FIG. 1A shows a schematic view of a head-mounted device 10 according to the 1st embodiment of the present disclosure. FIG. 1B shows another schematic view of the head-mounted device 10 according to the 1st embodiment in FIG. 1A. FIG. 1C shows an exploded view of the first light field camera 110 according to the 1st embodiment in FIG. 1A. In FIGS. 1A-1C, the head-mounted device 10 includes a first light field camera 110, a second light field camera 120, a first light field display 130, a second light field display 140 and a supporting structure 150. The second light field camera 120 and the first light field camera 110 face towards the same direction. The second light field display 140 and the first light field display 130 face towards the same direction. The first light field camera 110, the second light field camera 120, the first light field display 130 and the second light field display 140 are all connected to the supporting structure 150. Each of the first light field camera 110 and the second light field camera 120 includes the following elements in order from an object side to an image side, but the numeral references only show the elements of the first light field camera 110 in FIG. 1C: a lens group 115, a collimator 113 and an image sensor 114. The lens group 115 includes a plurality of lens units. The lens units are arranged in a two-dimensional lens array, and each of the lens units includes a lens container 111 and a plurality of lens elements.

In the 1st embodiment, the collimator 113 has a porous structure, and each of the lens elements is correspondingly disposed on each hole of the porous structure. Each of the lens units includes an imaging region 1131, and the image sensor 114 includes a sensing region 1141. A total area of the imaging regions 1131 of the lens units is smaller than an area of the sensing region 1141. Specifically, the sensing region 1141 of the image sensor 114 is a combined imaging region covering the imaging regions 1131 of the lens units so as to capture the images from each of the lens units in real time.

Figure 1D:
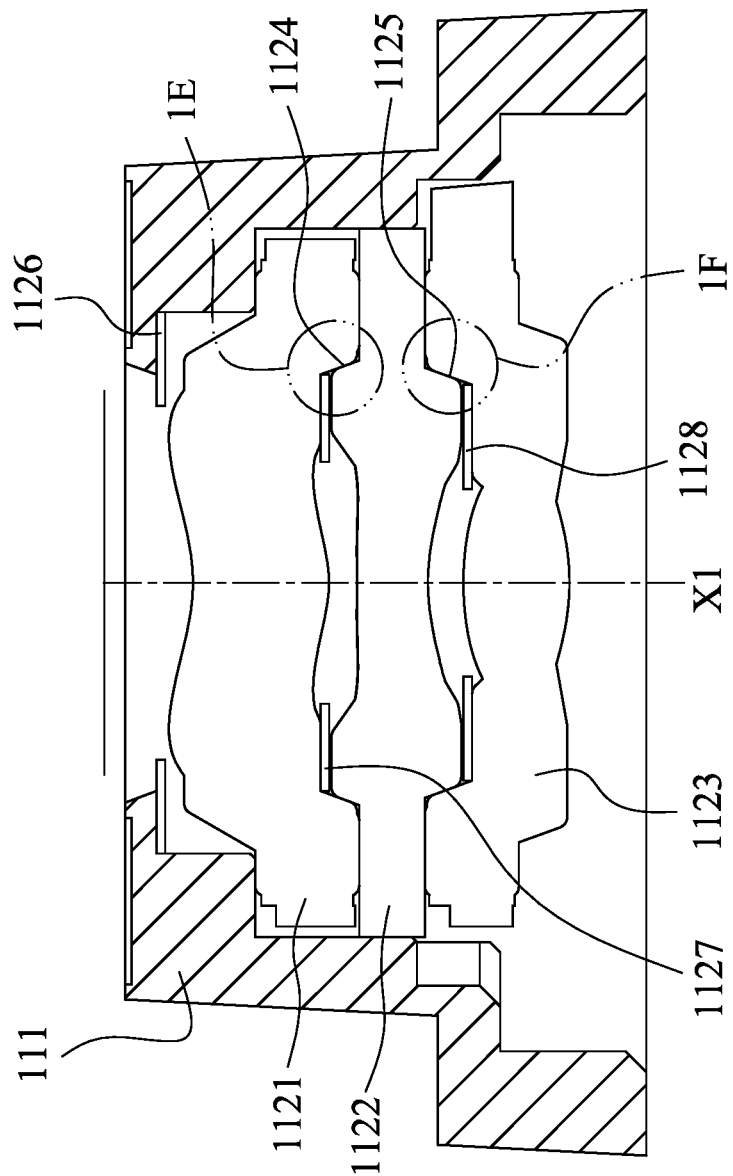

FIG. 1D shows a cross-sectional view of each of the lens units according to the 1st embodiment in FIG. 1C. As shown in FIGS. 1C and 1D, each of the lens units has an optical axis X1, and each of the lens units includes three lens elements, which are a first lens element 1121, a second lens element 1122 and a third lens element 1123, but the present disclosure is not limited thereto. The first lens element 1121, a second lens element 1122 and the third lens element 1123 are disposed in the lens container 111. Specifically, each of the lens units further includes three light blocking sheets 1126, 1127, 1128, which are disposed between the lens container 111 and the first lens element 1121, between the first lens element 1121 and the second lens element 1122, between the second lens element 1122 and the third lens element 1123, respectively. Each of the lens units further includes a first engaging structure with a first engaging surface 1124 and a second engaging structure with a second engaging surface 1125.

Figure 1F:
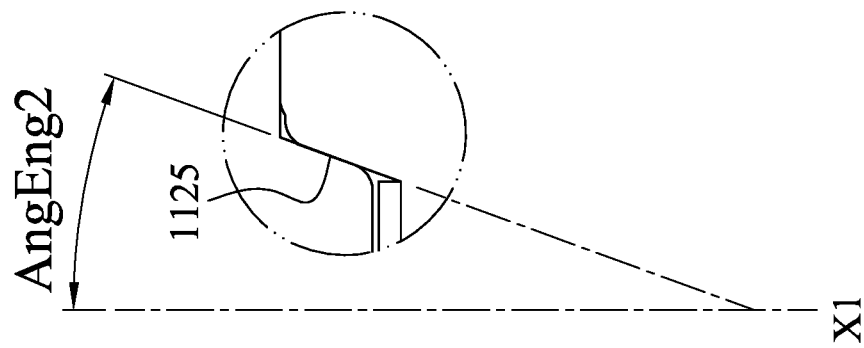
Figure 1E:
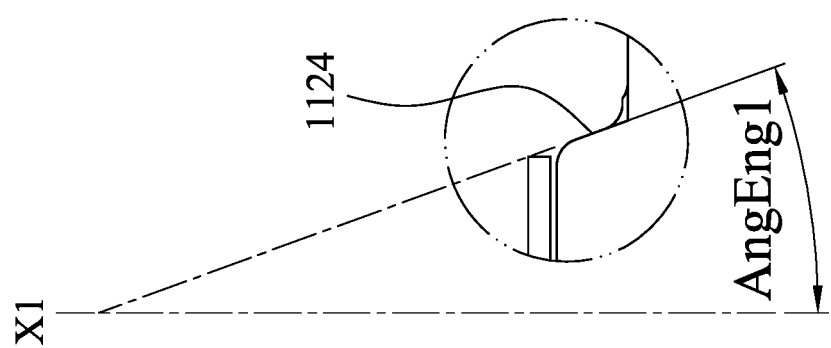

FIG. 1E shows a partial enlarged view of the first engaging structure according to the 1st embodiment in FIG. 1D. As shown in FIGS. 1D and 1E, the first engaging surface 1124 of the first engaging structure is a contact surface between the two adjacent lens elements which are the first lens element 1121 and the second lens element 1122. An acute angle AngEng1 between the first engaging surface 1124 and the optical axis X1 of the two adjacent lens elements (that is, the first lens element 1121 and the second lens element 1122) is 20 degrees.

FIG. 1F shows another partial enlarged view of the second engaging structure according to the 1st embodiment in FIG. 1D. As shown in FIGS. 1D and 1F, the second engaging surface 1125 of the second engaging structure is a contact surface between the two adjacent lens elements which are the second lens element 1122 and the third lens element 1123. An acute angle AngEng2 between the second engaging surface 1125 and the optical axis X1 of the other two adjacent lens elements (that is, the second lens element 1122 and the third lens element 1123) is 20 degrees.

In the 1st embodiment, a total image resolution of the imaging regions 1131 of the lens assemblies of the first light field camera 110 can be the same as a resolution of the first light field display 130, and a total image resolution of the imaging regions of the lens units of the second light field camera 120 can be the same as a resolution of the second light field display 140. Each of the first light field display 130 and the second light field display 140 can include 3.5 million pixels. Moreover, each of the first light field display 130 and the second light field display 140 is a light field display configured by a multi-view projector array, but the present disclosure is not limited thereto.

As shown in FIG. 1B, the head-mounted device 10 can further include a first eye tracking camera 160 and a second eye tracking camera 170. The first eye tracking camera 160 is disposed on the same side of the first light field display 130 and the second eye tracking camera 170 is disposed on the same side of the second light field display 140, and the first eye tracking camera 160 and the second eye tracking camera 170 are connected to the supporting structure 150, respectively.

In the 1st embodiment, a total number of the lens units of each of the lens groups Nlens is 7, but the present disclosure is not limited thereto.

Figure 1G:
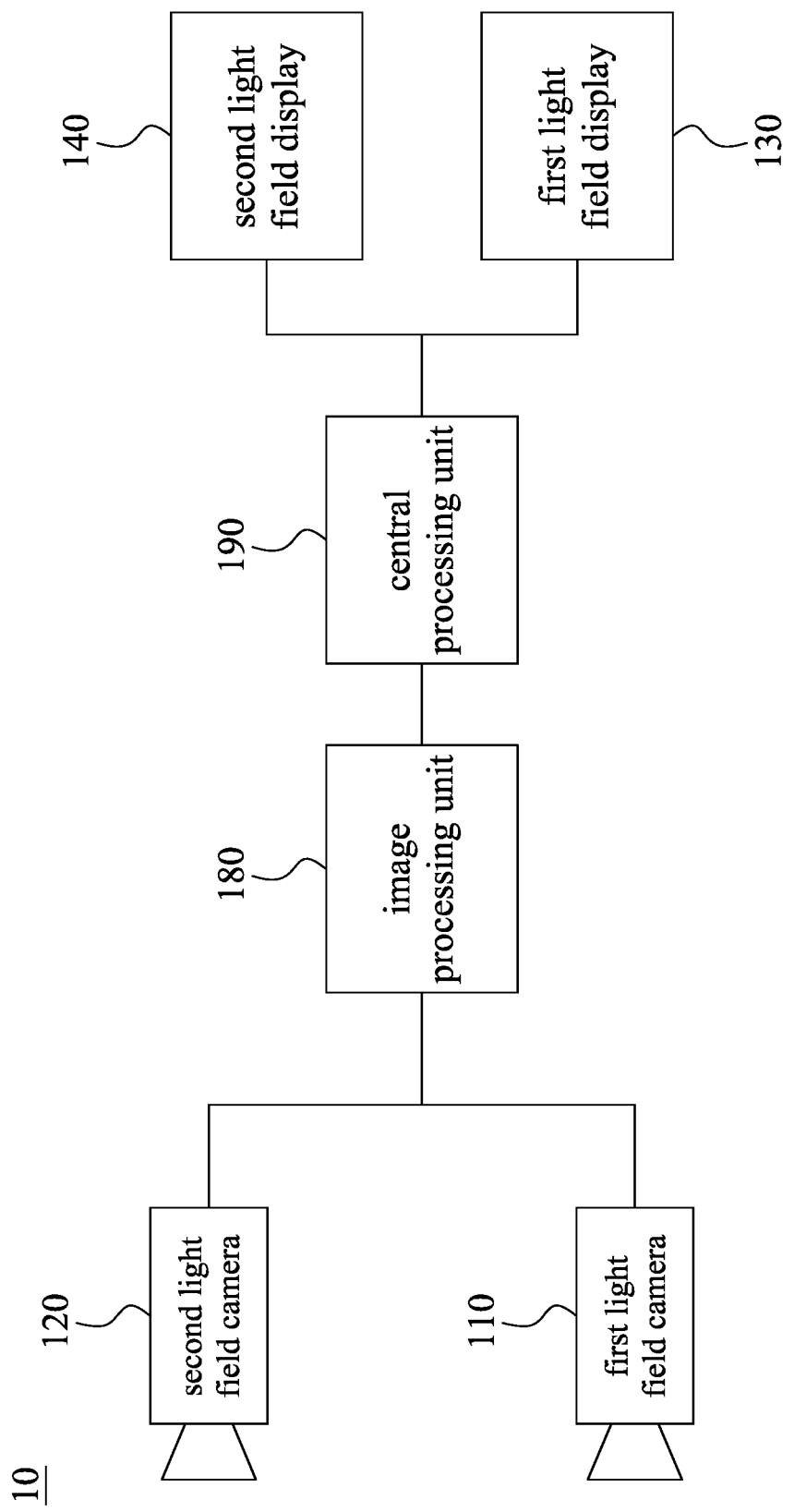

FIG. 1G shows a block schematic view of the head-mounted device 10 according to the 1st embodiment in FIG. 1A. As shown in FIG. 1G, the head-mounted device 10 can further include an image processing unit 180 and a central processing unit 190. The first light field camera 110 and the second light field camera 120 are connected to the image processing unit 180 with electric signal transmissions, respectively. The image processing unit 180 transmits optical signals of the first light field camera 110 and the second light field camera 120 to the central processing unit 190. After signal processing by the central processing unit 190, the optical signals are transmitted to the first light field display 130 and the second light field display 140. Hence, images generated from the processed optical signals can be displayed to the user.

2ND EMBODIMENT

Figure 2A:
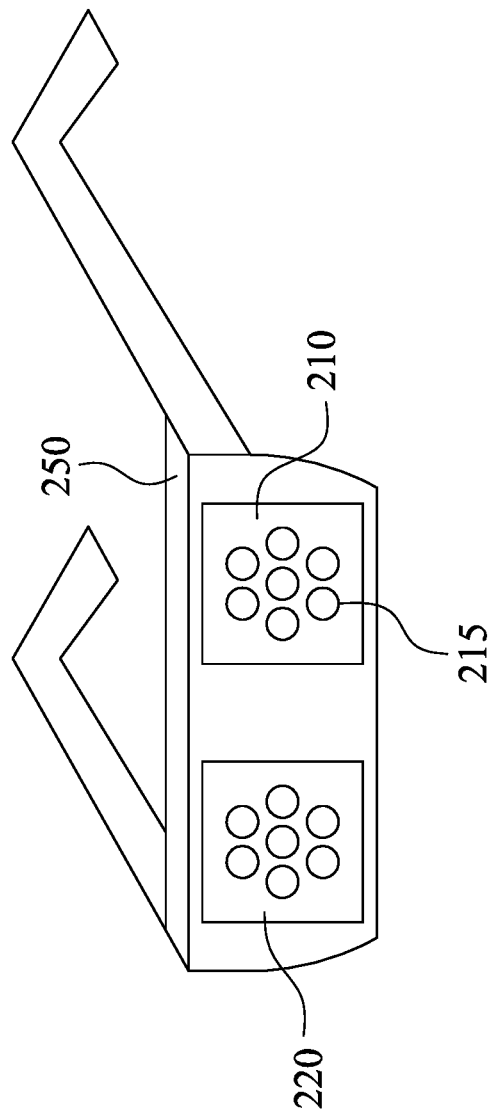
FIG. 2A shows a schematic view of a head-mounted device according to the 2nd embodiment of the present disclosure.
Figure 2B:
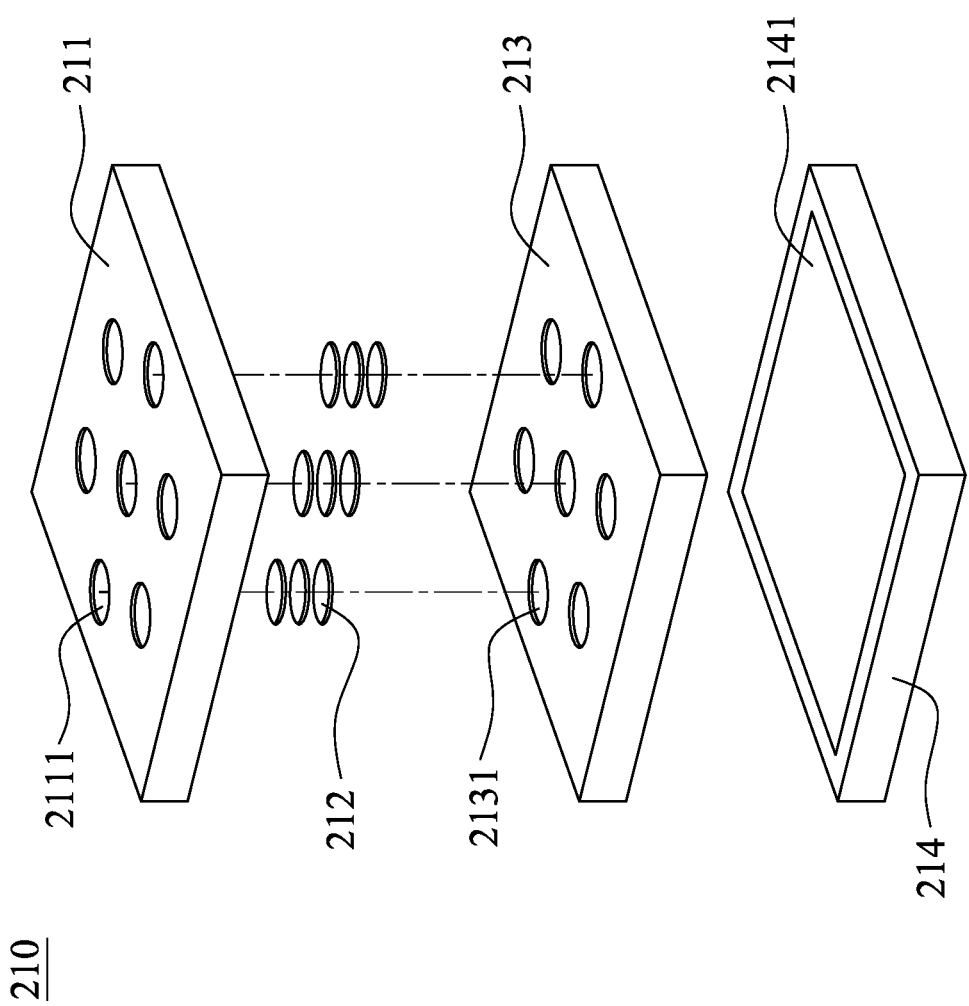
FIG. 2B shows an exploded view of the first light field camera according to the 2nd embodiment in FIG. 2A.

FIG. 2A shows a schematic view of a head-mounted device 20 according to the 2nd embodiment of the present disclosure. FIG. 2B shows an exploded view of the first light field camera 210 according to the 2nd embodiment in FIG. 2A. As shown in FIGS. 2A and 2B, the head-mounted device 20 includes a first light field camera 210, a second light field camera 220, a first light field display (its numeral reference is omitted), a second light field display (its numeral reference is omitted) and a supporting structure 250.

The first light field camera 210 includes the following elements in order from an object side to an image side: a lens group 215, a collimator 213 and an image sensor 214. The second light field camera 220 also includes its own respective elements in a similar configuration and will not be repeated here. The lens group 215 includes a lens group cover 211 and a plurality of lens assemblies 212. The lens group cover 211 includes a plurality of openings 2111, and the openings 2111 are arranged in a two-dimensional aperture array.

The lens assemblies 212 are arranged in a two-dimensional lens array corresponding to the two-dimensional aperture array formed by the openings 2111, and each of the lens assemblies 212 includes a plurality of lens elements. An engaging structure (its numeral reference is omitted) is disposed between at least two adjacent lens elements of the lens elements.

In the 2nd embodiment, the collimator 213 has a porous structure, and each of the lens assemblies 212 is corresponding to each of holes 2131 of the collimator 213 and disposed in the lens group cover 211. Each of lens assemblies 212 includes an imaging region (its numeral reference is omitted), and the image sensor 214 includes a sensing region 2141. A total area of the imaging regions of the lens assemblies 212 of the lens group 215 is smaller than an area of the sensing region 2141. Specifically, the sensing region 2141 of the image sensor 214 is an entire wide-range imaging region and covers the imaging regions of the lens assemblies 212 so as to capture images by each of the lens assemblies 212 in real time.

In the 2nd embodiment, the configuration of each of the lens assemblies 212 regarding its total number of the lens elements in each of the lens assemblies 212 and the structure of each of the lens assemblies 212 is the same as the configuration of each of the lens units in the 1st embodiment. Other corresponding elements of the head-mounted device 20 are the same as those of the head-mounted device 10 according to the 1st embodiment, and will not be described again herein.

3RD EMBODIMENT

Figure 3A:
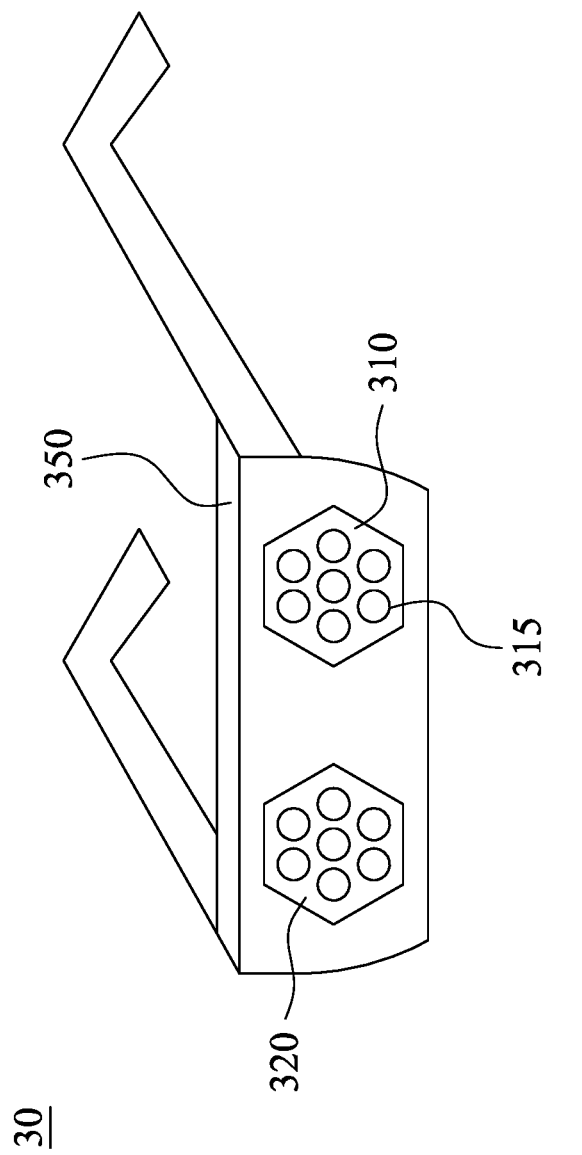
FIG. 3A shows a schematic view of a head-mounted device according to the 3rd embodiment of the present disclosure.
Figure 3B:
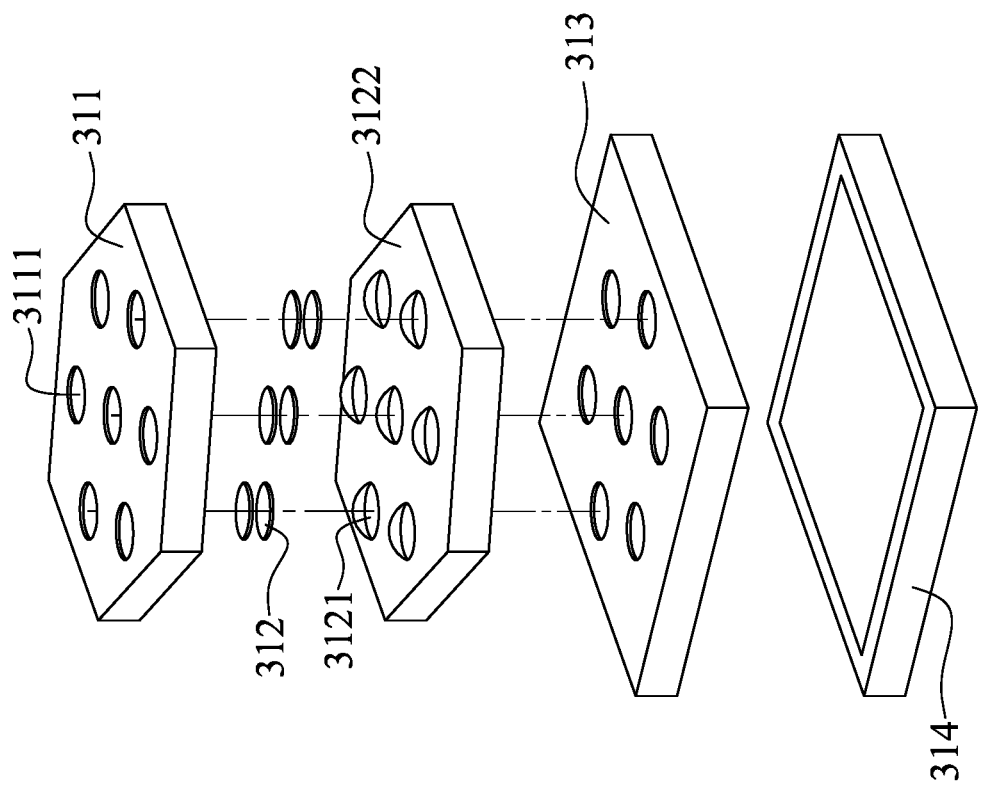
FIG. 3B shows a schematic view of the lens group of the first light field camera according to the 3rd embodiment in FIG. 3A.

FIG. 3A shows a schematic view of a head-mounted device 30 according to the 3rd embodiment of the present disclosure. FIG. 3B shows a schematic view of the lens group 315 of the first light field camera 310 according to the 3rd embodiment in FIG. 3A. As shown in FIGS. 3A and 3B, the head-mounted device 30 includes a first light field camera 310, a second light field camera 320, a first light field display (its numeral reference is omitted), a second light field display (its numeral reference is omitted) and a supporting structure 350. The first light field camera 310 includes the following elements, in order from an object side to an image side: a lens group 315, a collimator 313 and an image sensor 314. The second light field camera 320 also includes its own respective elements in a similar configuration and will not be repeated here. The lens group 315 includes a lens group cover 311 and a plurality of lens assemblies 312. The lens group cover 311 includes a plurality of openings 3111, and the openings 3111 are arranged in a two-dimensional aperture array. The lens assemblies 312 are arranged in a two-dimensional lens array corresponding to the two-dimensional aperture array, and each of the lens assemblies 312 includes a plurality of lens elements. An engaging structure (its numeral reference is omitted) is disposed between at least two adjacent lens elements of the lens elements.

As shown in FIG. 3B, one of the two adjacent lens elements of each of the lens assemblies 312 is an array element 3121, and a lens array structure 3122 is formed by the plurality of the array elements 3121, and the lens array structure 3122 is corresponding to the two-dimensional lens array formed by the lens assemblies 312.

4TH EMBODIMENT

Figure 4B:
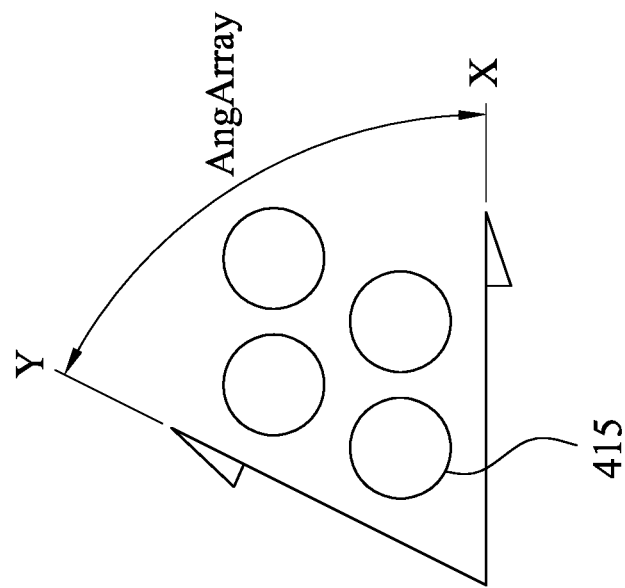
FIG. 4B shows a partial schematic view of the two-dimensional lens array of the lens assemblies of the second light field camera according to the 4th embodiment in FIG. 4A.
Figure 4A:
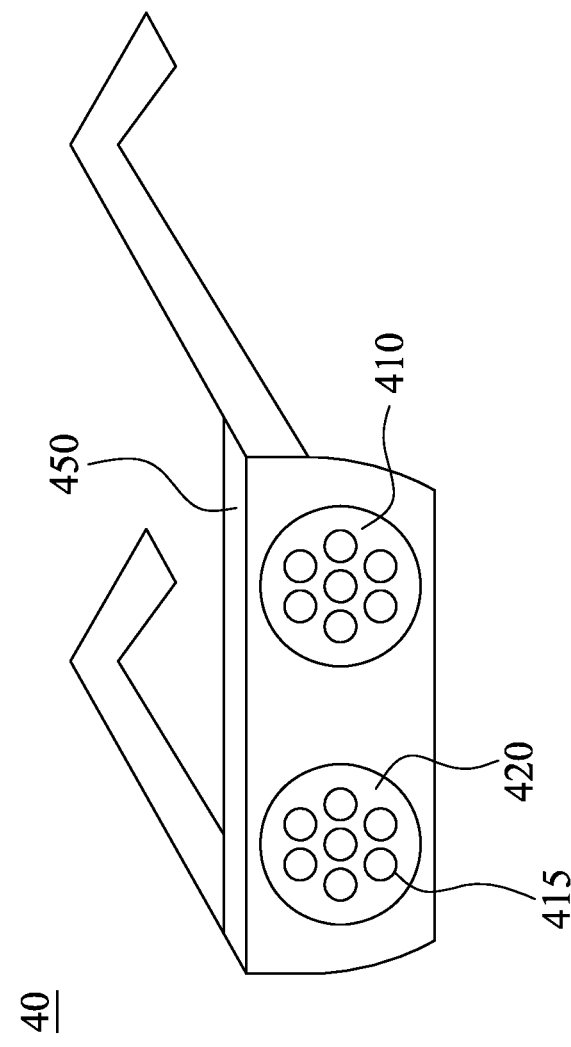
FIG. 4A shows a schematic view of a head-mounted device according to the 4th embodiment of the present disclosure.

FIG. 4A shows a schematic view of a head-mounted device 40 according to the 4th embodiment of the present disclosure. As shown in FIG. 4A, a first light field camera 410 and a second light field camera 420 of the head-mounted device 40 are all connected to supporting structure 450 of the head-mounted device 40. The first light field camera 410 and the second light field camera 420 can be circular in shapes. Other elements of the head-mounted device 40 can be configured as the same as the elements according to the 1st embodiment to the 3rd embodiment, but the present disclosure is not limited thereto.

FIG. 4B shows a partial schematic view of the two-dimensional lens array of the lens assemblies 415 of the second light field camera 420 according to the 4th embodiment in FIG. 4A. As shown in FIGS. 4A and 4B, a two-dimensional lens array formed by the lens assemblies 415 of the second light field camera 420 can have a row direction X and a column direction Y in the two-dimensional lens array. Both the row direction X and the column direction Y are perpendicular to the optical axis of each of the lens assemblies 415 of the second light field camera 420. In detail, an XY plane formed by the row direction X and the column direction Y in the two-dimensional lens array is perpendicular to the optical axis of each of the lens assemblies 415 of the second light field camera 420. The optical axis of each of the lens assemblies 415 of the second light field camera 420 faces towards a direction of an object, that is, a visual direction of the user. Some of the lens assemblies 415 are arranged with the same interval along with the row direction X, and some of the lens assemblies 415 are arranged with the same interval along with the column direction Y. The row direction X is not parallel to the column direction Y. In the 4th embodiment, an angle AngArray between the row direction X and the column direction Y in the two-dimensional lens array formed by the lens assemblies 415 is 63 degrees, so that the lens assemblies 415 are arranged in a hexagonal structure like a honeycomb.

5TH EMBODIMENT

FIG. 5A shows a schematic view of a head-mounted device 50 according to the 5th embodiment of the present disclosure. As shown in FIG. 5A, a first light field camera 510 and a second light field camera 520 of the head-mounted device 50 are all connected to supporting structure 550 of the head-mounted device 50. The first light field camera 510 and the second light field camera 520 can be rectangular in shapes. Other elements of the head-mounted device 50 can be configured as the same as the elements according to the 1st embodiment to the 3rd embodiment, but the present disclosure is not limited thereto.

FIG. 5B shows a partial schematic view of the two-dimensional lens array of the lens units 515 of the second light field camera 520 according to the 5th embodiment in FIG. 5A. As shown in FIGS. 5A and 5B, a two-dimensional lens array formed by the lens units 515 of the second light field camera 520 can have a row direction X and a column direction Y in the two-dimensional lens array. Both of the row direction X and the column direction Y are perpendicular to the optical axis of each of the lens units 515 of the second light field camera 520. In detail, an XY plane formed by the row direction X and the column direction Y in the two-dimensional lens array is perpendicular to the optical axis of each of the lens units 515 of the second light field camera 520. The optical axis of each of the lens units 515 of the second light field camera 520 faces towards a direction of an object, that is, a visual direction of the user. Some of the lens units 515 are arranged with the same interval along with the row direction X, and some of the lens units 515 are arranged with the same interval along with the column direction Y. The row direction X is not parallel to the column direction Y. In the 5th embodiment, an angle AngArray between the row direction X and the column direction Y in the two-dimensional lens array formed by the lens units 515 is 90 degrees so that the lens units 515 have a rectangular arrangement.

6TH EMBODIMENT

FIG. 6 shows a schematic view of a first light field camera 610 of a head-mounted device according to the 6th embodiment of the present disclosure. As shown in FIG. 6, a lens group of the first light field camera 610 includes a first lens subgroup 616 and a second lens subgroup 617, and a two-dimensional lens array can be formed by the first lens subgroup 616 and the second lens subgroup 617. A maximum field of view of a plurality of lens units of the first lens subgroup 616 is larger than a maximum field of view of a plurality of lens units of the second lens subgroup 617. In the 6th embodiment, the lens units of the first lens subgroup 616 are configured to be wide-angle lens units, and the maximum field of view of the lens units of the first lens subgroup 616 is 80 degrees. The lens units of the second lens subgroup 617 are configured to be telephoto lens units, and the maximum field of view of the lens units of the second lens subgroup 617 is 40 degrees. Moreover, the lens units of the first lens subgroup 616 and the second lens subgroup 617 can be replaced by the lens group cover 211 and the lens assemblies 212 in the 2nd embodiment according to requirements, but the present disclosure is not limited thereto.

In the 6th embodiment, a total number of the lens units of each of the lens groups Nlens is 30. Furthermore, the two-dimensional lens array formed by the first lens subgroup 616 and the second lens subgroup 617 can have a row direction and a column direction which are similar with the row direction X and the column direction Y of the 5th embodiment. In the 6th embodiment, an angle between the row direction and the column direction is 90 degrees so that the first lens subgroup 616 and the second lens subgroup 617 have a rectangular arrangement.

7TH EMBODIMENT

Figure 7:
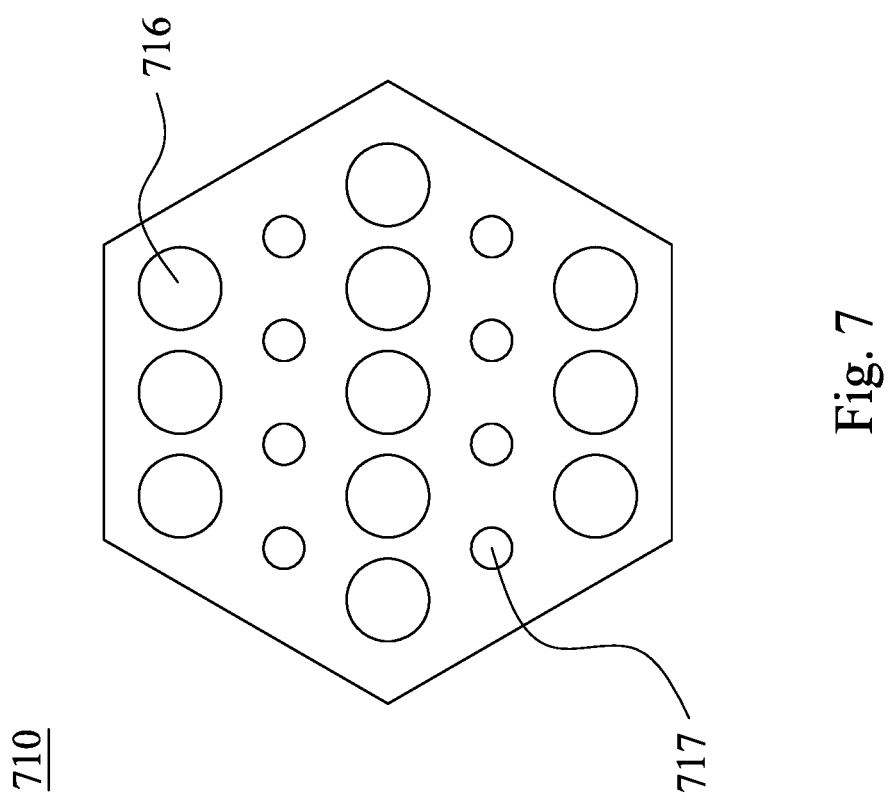
FIG. 7 shows a schematic view of a first light field camera of a head-mounted device according to the 7th embodiment of the present disclosure.

FIG. 7 shows a schematic view of a first light field camera 710 of a head-mounted device according to the 7th embodiment of the present disclosure. As shown in FIG. 7, a lens group of the first light field camera 710 includes a first lens subgroup 716 and a second lens subgroup 717, and a two-dimensional lens array can be formed by the first lens subgroup 716 and the second lens subgroup 717. A maximum field of view of a plurality of lens units of the first lens subgroup 716 is larger than a maximum field of view of a plurality of lens units of the second lens subgroup 717. In the 7th embodiment, the lens units of the first lens subgroup 716 are configured to be wide-angle lens units, and the maximum field of view of the lens units of the first lens subgroup 716 is 80 degrees. The lens units of the second lens subgroup 717 are configured to be telephoto lens units, and the maximum field of view of the lens units of the second lens subgroup 717 is 40 degrees. Moreover, the lens units of the first lens subgroup 716 and the second lens subgroup 717 can be replaced by the lens group cover 211 and the lens assemblies 212 in the 2nd embodiment according to requirements, but the present disclosure is not limited thereto.

In the 7th embodiment, a total number of the lens units of each of the lens groups Nlens is 19. Furthermore, the two-dimensional lens array formed by the first lens subgroup 716 and the second lens subgroup 717 can have a row direction and a column direction which are similar with the row direction X and the column direction Y of the 4th embodiment. In the 7th embodiment, an angle between the row direction and the column direction is 63 degrees so that the first lens subgroup 716 and the second lens subgroup 717 are arranged in a hexagonal structure like a honeycomb.

8TH EMBODIMENT

Figure 8:
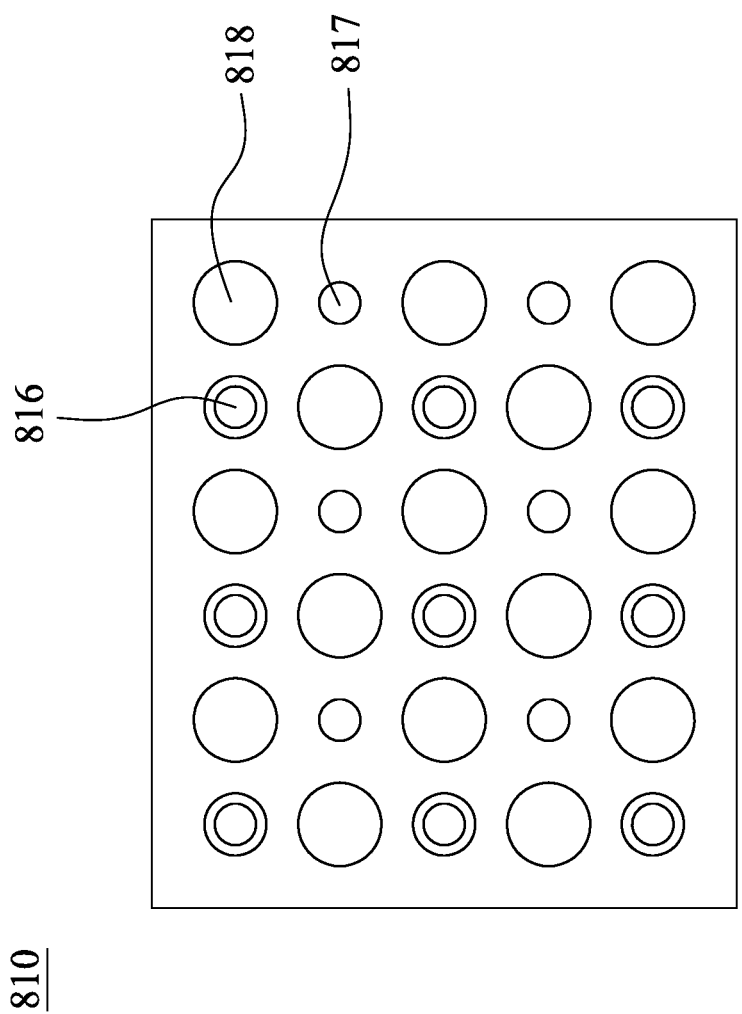
FIG. 8 shows a schematic view of a first light field camera of a head-mounted device according to the 8th embodiment of the present disclosure.

FIG. 8 shows a schematic view of a first light field camera 810 of a head-mounted device according to the 8th embodiment of the present disclosure. As shown in FIG. 8, a lens group of the first light field camera 810 of the head-mounted device includes a first lens subgroup 816, a second lens subgroup 817 and a third lens subgroup 818, and a two-dimensional lens array can be formed by the first lens subgroup 816, the second lens subgroup 817 and the third lens subgroup 818. A maximum field of view of a plurality of lens units of the first lens subgroup 816 is larger than a maximum field of view of a plurality of lens units of the second lens subgroup 817. A maximum field of view of a plurality of lens units of the third lens subgroup 818 is larger than the maximum field of view of the lens units of the first lens subgroup 816 and the maximum field of view of the lens units of the second lens subgroup 817. In the 8th embodiment, the lens units of the first lens subgroup 816 are configured to be wide-angle lens units, and the maximum field of view of the lens units of the first lens subgroup 816 is 80 degrees. The lens units of the second lens subgroup 817 are configured to be telephoto lens units, and the maximum field of view of the lens units of the second lens subgroup 817 is 40 degrees. The lens units of the third lens subgroup 818 are configured to be ultra-wide angle lens units, and the maximum field of view of the lens units of the third lens subgroup 818 is 120 degrees. Moreover, the lens units of the first lens subgroup 816, the second lens subgroup 817 and the third lens subgroup 818 can be replaced by the lens group cover 211 and the lens assemblies 212 in the 2nd embodiment according to requirements, but the present disclosure is not limited thereto.

In the 8th embodiment, a total number of the lens units of each of the lens groups Nlens is 30.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A head-mounted device, comprising:
a first light field camera;
a second light field camera, wherein the first light field camera and the second light field camera face towards a same direction;
a first light field display;
a second light field display, wherein the first light field display and the second light field display face towards a same direction; and
a supporting structure, wherein the first light field camera, the second light field camera, the first light field display and the second light field display are all connected to the supporting structure;
wherein each of the first light field camera and the second light field camera comprises, in order from an object side to an image side, a lens group, a collimator and an image sensor;
wherein each of the lens groups comprises:
a plurality of lens units arranged in a two-dimensional lens array, and each of the lens units comprising a lens container and a plurality of lens elements, wherein a first engaging structure is disposed between two adjacent lens elements of the plurality of lens elements;
wherein an angle between a row direction and a column direction in the two-dimensional lens array is AngArray, and the following condition is satisfied:

30 degrees<AngArray≤90 degrees.

2. The head-mounted device of claim 1, wherein each of the lens units comprises an imaging region, and each of the image sensors comprises a sensing region; in each of the first and second light field cameras, a total area of the imaging regions of the lens units thereof is smaller than an area of the sensing region thereof.

3. The head-mounted device of claim 2, wherein a total image resolution of the first light field camera is the same as a resolution of the first light field display, and a total image resolution of the second light field camera is the same as a resolution of the second light field display.

4. The head-mounted device of claim 3, wherein each of the first light field display and the second light field display comprises at least two million pixels.

5. The head-mounted device of claim 1, wherein the first engaging structure comprises:
a first engaging surface being a contact surface between the two adjacent lens elements, wherein an acute angle between the first engaging surface and an optical axis of the two adjacent lens elements is AngEng1, and the following condition is satisfied:

5 degrees<AngEng1<85 degrees.

6. The head-mounted device of claim 5, wherein there is a second engaging structure between other two adjacent lens elements comprising:
a second engaging surface being a contact surface between the other two adjacent lens elements, wherein an acute angle between the second engaging surface and an optical axis of the other two adjacent lens elements is AngEng2, and the following condition is satisfied:

5 degrees<AngEng2<85 degrees.

7. The head-mounted device of claim 1, wherein each of the lens groups further comprises:
a first lens subgroup; and
a second lens subgroup, wherein a maximum field of view of each lens unit of the first lens subgroup is larger than a maximum field of view of each lens unit of the second lens subgroup.

8. The head-mounted device of claim 7, wherein each of the lens groups further comprises:
a third lens subgroup, wherein a maximum field of view of each lens unit of the third lens subgroup is larger than the maximum field of view of each lens unit of the first lens subgroup and the maximum field of view of each lens unit of the second lens subgroup.

9. The head-mounted device of claim 1, wherein a total number of the lens units in each of the lens groups is Nlens, and the following condition is satisfied:

6<Nlens.

10. The head-mounted device of claim 1, wherein each of the first light field display and the second light field display is a multi-view projector array.

11. The head-mounted device of claim 1, further comprising:
a first eye tracking camera; and
a second eye tracking camera;
wherein the first eye tracking camera is disposed on a same side of the first light field display, and the second eye tracking camera is disposed on a same side of the second light field display, and both the first eye tracking camera and the second eye tracking camera are connected to the supporting structure.

12. A head-mounted device, comprising:
a first light field camera;
a second light field camera, wherein the first light field camera and the second light field camera face towards a same direction;
a first light field display;
a second light field display, wherein the first light field display and the second light field display face towards a same direction; and
a supporting structure, wherein the first light field camera, the second light field camera, the first light field display and the second light field display are all connected to the supporting structure;
wherein each of the first light field camera and the second light field camera comprises, in order from an object side to an image side, a lens group, a collimator and an image sensor;
wherein each of the lens groups comprises:
a lens group cover comprising a plurality of openings, and the openings arranged in a two-dimensional aperture array; and
a plurality of lens assemblies arranged in a two-dimensional lens array corresponding to the two-dimensional aperture array, each of the lens assemblies comprising a plurality of lens elements, wherein a first engaging structure is disposed between two adjacent lens elements of each of the lens assemblies;
wherein an angle between a row direction and a column direction in the two-dimensional lens array is AngArray, the following condition is satisfied:

30 degrees<AngArray≤90 degrees.

13. The head-mounted device of claim 12, wherein each of the lens assemblies comprises an imaging region, and each of the image sensors comprises a sensing region; in each of the first and second light field cameras, a total area of the imaging regions of the lens assemblies is smaller than an area of the sensing region.

14. The head-mounted device of claim 13, wherein a total image resolution of the first light field camera is the same as a resolution of the first light field display, and a total image resolution of the second light field camera is the same as a resolution of the second light field display.

15. The head-mounted device of claim 12, wherein the first engaging structure comprises:
a first engaging surface being a contact surface between the two adjacent lens elements, wherein an acute angle between the first engaging surface and an optical axis of the two adjacent lens elements is AngEng1, and the following condition is satisfied:

5 degrees<AngEng1<85 degrees.

16. The head-mounted device of claim 12, wherein one of the two adjacent lens elements of each of the lens assemblies is an array element, and a lens array structure is formed by a plurality of the array elements, and each array element of the lens array structure corresponds to each of the lens assemblies of the two-dimensional lens array formed by the lens assemblies.

17. The head-mounted device of claim 12, wherein each of the lens groups further comprises:
a first lens subgroup; and
a second lens subgroup, wherein a maximum field of view of each lens unit of the first lens subgroup is larger than a maximum field of view of each lens unit of the second lens subgroup.

18. The head-mounted device of claim 12, further comprising:
a first eye tracking camera; and
a second eye tracking camera, wherein the first eye tracking camera is disposed on a same side of the first light field camera, the second eye tracking camera is disposed on a same side of the second light field camera, and the first eye tracking camera and the second eye tracking camera are both connected to the supporting structure.

* * * * *